United States Patent [19]

Bartholomew

[11] Patent Number: 4,843,686
[45] Date of Patent: Jul. 4, 1989

[54] HOSE CLAMP

[75] Inventor: Donald D. Bartholomew, Marine City, Mich.

[73] Assignee: Proprietary Technology, Inc., Southfield, Mich.

[21] Appl. No.: 170,128

[22] Filed: Mar. 14, 1988

Related U.S. Application Data

[63] Continuation of Ser. No. 63,803, Jun. 23, 1987, abandoned, which is a continuation of Ser. No. 916,115, Oct. 7, 1986, abandoned.

[51] Int. Cl.$^4$ .............................................. B65D 63/00
[52] U.S. Cl. ........................................ 24/19; 24/20 R; 24/271
[58] Field of Search .................... 24/19, 20 R, 20 TT, 24/20 EE, 271, 275, 273, 281; 277/166

[56] References Cited

U.S. PATENT DOCUMENTS

| Re. 21,263 | 11/1939 | Kaden . | |
|---|---|---|---|
| 1,073,533 | 9/1913 | Shipp | 24/271 |
| 1,433,201 | 10/1922 | Grant . | |
| 1,705,895 | 3/1929 | Blair | 24/20 TT |
| 1,779,806 | 10/1930 | Dunwoodie | 24/275 |
| 1,823,139 | 9/1931 | Goetzelman | 24/281 |
| 2,754,157 | 7/1956 | Thiman . | |
| 2,821,004 | 1/1958 | Romano et al. | 24/273 |
| 2,920,370 | 1/1960 | Guy | 24/271 |
| 3,324,234 | 6/1967 | Hervig | 24/20 R |
| 3,370,122 | 2/1968 | Ichikawa | 24/20 TT |
| 3,724,603 | 4/1973 | Shiomi et al. . | |
| 4,308,648 | 1/1982 | Fay | 24/20 R |
| 4,402,113 | 9/1983 | Smith | 24/20 R |
| 4,480,359 | 11/1984 | Koster | 24/271 |
| 4,702,481 | 10/1987 | Brammer | 277/166 |

FOREIGN PATENT DOCUMENTS

| 3018383 | 1/1985 | Denmark . | |
|---|---|---|---|
| 0487202 | 12/1929 | Fed. Rep. of Germany | 24/20 EE |
| 2470275 | 6/1981 | France | 24/20 R |

Primary Examiner—Victor N. Sakran
Attorney, Agent, or Firm—Harness, Dickey, Pierce

[57] ABSTRACT

A hose clamp for securing a flexible conduit onto a fitting is disclosed. The hose clamp includes a flat elongated metallic strip having a pair of end portions. The strip has a biasing portion integrally formed from the strip between the two end portions. The biasing portion provides the strip with resilient characteristics. Also, a mechanism for securing the two end portions to one another is formed or secured onto the end portions of the metallic strip. Also, an integral mechanism may be formed on the strip for securing the clamp to the flexible conduit prior to assembly onto the fitting.

23 Claims, 4 Drawing Sheets 4,843,686

HOSE CLAMP

This is a continuation of U.S. patent application Ser. No. 063,803, filed June 23, 1987, entitled "Hose Clamp"; which is a continuation of U.S. patent application Ser. No. 916,115 filed Oct. 7,1986, entitled "A Hose Clamp", both now abandoned.

BACKGROUND AND SUMMARY OF INVENTION

The present invention relates to hose clamps and more particularly, to hose clamps having a biasing portion integrally formed in the clamp.

Hose clamps are used to secure flexible conduits onto fittings by applying radially inward compressive forces onto the conduits for frictionally securing the conduits onto the fittings. Particularly in the automotive industry, hose clamps play an important role in securing flexible hoses onto the engine block and like components.

There are a number of types of hose clamps: (1) Wire or strip band, clamped by screw; (2) Strip band, clamped by deformation of a portion of the band (Oetiker and Keystone types); (3) Wire or strip spring types, clamped by spring forces where the wire or strip is deformed into a spring ring of smaller diameter than the hose so that when the clamp is installed over the hose a pattern of radially inwardly directed forces tend to squeeze the hose. All of these types of clamps are commonly used and vary considerably in effectiveness and cost to manufacture.

In general, the optimum clamp possesses the following features: low cost; uniformly inwardly radially directed forces to compress a hose onto a male tubular element to which the hose is being connected; a wide band for exhibiting a large peripheral "footprint" to reduce unit loading forces on the hose surface so that the hose material is least damaged by the inward forces; a means of assuring that the clamping force is sufficient and yet the force is not excessive; the clamp is suitable for a number of different methods of closing, tightening or cinching with or without tools; manufacturable from materials that may be treated to retard corrosion or are not sensitive to corrosion; and visual inspectability to assure that the clamp is correctly installed or torqued, if a threaded closure is used.

The hose clamp of the present invention, disclosed herein, moves the industry closer to this optimum goal. The present invention employs a novel spring concept for providing a method for overcoming the functional drawbacks of the presently available hose clamps.

The following is a description of the primary functional factors which must be satisfied in clamping a flexible hose to a nipple. Also, listed are the many disadvantages of existing hose clamps.

If it were possible to inexpensively manufacture flexible hoses with very close wall thickness, inside diameter control, and to manufacture mating nipple with close tolerances, at low cost, then the clamping problem would be reduced to merely producing a strip ring having a closely controlled inside diameter in its fully closed position and crimping or bolting the clamp to fix the strip ring onto the hose in the fully closed position. Unfortunately, high cost prevents making male nipples and flexible hoses having the close tolerances necessary to make this possible. Tolerances of cast nipples and hose wall thickness may have circumferential variations of over 3/16 inch on a hose that is installed onto a ⅝ male nipple. With this being the case, there are essentially the following choices:

(a) Close the clamp band to a diameter such that the smallest outside diameter hose is adequately clamped. If this is done, then the material of the hose is severely over stressed at the larger end of the hose outside diameter range. This alternative is generally not used because it causes premature failure of the hose.

(b) To accomodate the diameter range, screw "draw-in" type clamps are used, however, these types of clamps depend on torquing the screw down to produce proper inward forces. These types of clamps are commonly used, but have several disadvantages in controlling the inward forces exerted by the clamp. One disadvantage is the variation of frictional characteristics between the threaded members. It is important that the variations such that the friction be large enough to prevent the screw from loosening, yet not have a variable effect on the torque, which is the means by which proper clamping force is controlled. Other disadvantages are controlling wrenching torque (the human or automatic wrench repeatability factor), controlling "cold flow" of the hose material which "flows" away from the compressed area under the clamp over a period of time. The "cold flow" is why screw type hose clamps must be periodically tightened to maintain proper retention; and why most new hose installations should be "retorqued" a month or two after installation. The inability to quickly and accurately inspect whether or not the clamp is properly tightened is also a disadvantage. While a torque wrench may be used to insure proper torque, this is seldom done and such means is subject to the above mentioned difficulties.

To insure proper tightening of screw type clamps, the clamp must be tightened significantly more than is desired. The tightening compensates for "cold flow", causing higher inward forces to be present than a desirable compression range when first installed, and resulting in lower inward forces to be present after "cold flow" has taken place. During the initial higher than acceptable compression period, the hose is rapidly degraded and its life is significantly shortened.

(c) Use a formed spring wire or band ring having a diameter smaller than the outside diameter of the flexible hose on which it is to be installed. At first, such a configuration appears to be a good solution, however, further investigation indicates that this is not the case. Generally, these types of clamps have their wire ends by-pass each other by a distance sufficient to prevent the round hose shape from merely acting to cause skidding open of the clamp in response to inward forces produced between the ends of the clamp and the portion of the ring diagonally across from the ends. A tighter bend radius, in the portion of the ring diagonally across from the ends, compensates for "no-force" contribution existing at the ends area of the ring. This "no-force" contribution requires approximately twice the force to be exerted from this diagonally across area to produce the inward forces at right angles to the area diagonally across from the ends area which, in turn, produces non-uniform inward forces. The wire clamp provides a very narrow "footprint" which produces very high unit loading on the hose material which, in turn, shortens the life of the hose. This "footprint" problem is avoided by using a circular strip spring clamp having the strip bent into a ring so that the strip width is increased, increasing the footprint, and reducing hose damage. The inward force non-uniformity is still present, only the "footprint" has been improved.

(d) Strip band type clamps that are cinched together over the installed diameter may also be used. These types of clamps may be closed with special tools that limit the closing force to accomplish some amount of under/over cinching control. Disadvantages with these types of clamps are variations in metal thickness of the strip; heat treat temper of the metal; and variations in the bending and forming of the metal which is to be deformed in order to cinch the clamp closed. Efforts to obtain a set pull together force during cinching are almost completely defeated by these factors. Since the clamp cannot be completely closed, as previously discussed, there exists a major risk of substantial damage to the hose with these clamps.

Efforts to obtain ideal hose clamps have resulted in several patents. The following patents illustrate the state of the art.

German Patent No. 3,018,383 illustrates a clamp which may be applied to a conduit which clamps the hose in a manner to prevent leakage.

U.S. Pat. No. 1,779,806, issued Oct. 28, 1930, discloses a clamp which may be readily applied to a conduit which clamps the hose in a manner to prevent leakage even through excessive high fluid pressures. To this end, the well known open ring clamp of any type used in securing a rubber hose, or the like, to a metal tube, is provided with a resilient, contractible, and expenseful clamping member that is interposed between the rubber hose and the open ring clamp.

U.S. Pat. No. 1,823,139, issued Sept. 15, 1931, discloses a clamp comprising a strap of bendable metal adapted to be wrapped around a pipe or bar. The strap has one long edge having a series of notches and a clevis device adapted to embrace two overlining sections of the strap when so wrapped and extended into the notch in each section.

U.S. Pat. No. 3,324,234, issued June 6, 1967, discloses a clamp for making a connection with cables, rods, hex bars, and other conductive structures having generally circular cross sections. The clamp consists of a metal band with contact legs based along the longitudinal edges. When applied, the contact edges on each side of the connector exert a constant force against the object to be connected. This force is developed by the use of laterally extending resilient segments at the end of which are disposed the contact legs. The connector is provided with a tab and slot arrangement so it can be quickly fastened around the objects to be connected.

Accordingly, it is an object of the present invention to overcome the disadvantages of the above art. The present invention provides the art with a clamp having a large footprint area for applying substantially equal radial forces around the circumference of a flexible conduit. The present invention eliminates the above explained torque dilemma. Also, the present invention eliminates uneven forces provided at the connection ends of the clamp.

The new and improved hose clamp of the present invention includes a flat elongated metallic strip having a pair of end portions. A biasing portion is integrally formed from the elongated strip between the two end portions. Bending of the strip material is not required to achieve the spring response of the biasing portion. The biasing portion provides the strip with the ability to be stretched along the strip length direction and with resilient characteristics in the axial direction. A mechanism secured on the end portions enables removable fastening of the ends to one another, or the ends may be formed enabling locking of the ends to one another without the use of auxilary fasteners, or separate parts.

Generally, the flat elongated strip is formed from a strip of sheet metallic material. The biasing portion may be formed in the strip by a stamping/blanking process to remove material from the elongated strip, forming a serpentine configuration in the strip.

Also disclosed is a method of manufacturing the clamp of the present invention. The method includes providing a flat elongated metallic strip having two ends; forming a biasing portion in the elongated strip between the ends; and affixing or forming the means for fastening the ends to one another onto the ends of the elongated strip. Further, the forming may include stamping the elongated strip such that the integral serpentine configuration is formed between the ends of the strip, in the strip, in a manner to control the spring response characteristics of the biasing portion.

Further, the disadvantages and considerations of (a-d), above, enable one skilled in the art to appreciate the novelty and advantages gained by the serpentine strip spring clamp. The serpentine strip spring is formed by removing material from the strip band. By removing material from a strip of a given length, the resulting formed strip has a serpentine shape with a lesser width but with a longer length. The strip thickness also determines the strength of the spring in extension or stretch. The length of the serpentine is related to the extension the spring will provide under a given pulling force. For example, using 0.020 or 0.025 inch thickness strip, a spring may be produced which will stand a pull of several hundred pounds without failing. This is generally 10 to 100 times the pull force that can be achieved by bending these materials to produce a spring. Forces of this magnitude are more than adequate to produce the desired force for a given hose clamp. The "spring constant" (force divided by unit extension) is controlled by the serpentine length and material thickness, which relates to the original strip width and length as explained herein.

The serpentine configuration may, if properly dimensioned, yield a spring constant which is derived from several quite different deformations of the material. In the case of a hose clamp, it is desirable to have a large spring constant to initially provide a minimum inwardly directed oompressive force as the clamp is initially closed. This is derived by deforming the serpentine across its wide dimension. Once this initial force is achieved, it is desirable to have further closing of the clamp (extension of the spring) shift into a lower spring constant mode so that a lower force results from contimued closure. This is achieved by dimensioning the serpentine so that deformation begins to occur across the stock thickness. Since the stock thickness is less than the stock width, a lower spring constant is achieved during this mode. This accomodates the normal hose/nipple tolerances.

The user chooses a clamp by deciding the desired force range which is optimum between the inside diameter and outside diameter limits of the installed hose; the axount of hose material cold flow that will result (which is much less than conventional clamps since an "over force" is not necessary and a large "footprint" is still achieved); and selects the cost efficient combination of strip material thickness and spring constant for the intended circumference situation. By using the combination spring constants, the pull difference between the smallest installed hose outside diameter and largest installed hose outside diameter is easily brought within the acceptable compression range of the hose material.

The disclosed method of making a spring clamp enables positive closing of the clamp to a known position. This closing eliminates the human variability of the closing operation, and enables straight forward inspection of the clamp to determine if the clamp has been closed or not.

Reviewing the features for an optimum clamp and comparing them to the serpentine strip spring clamp, the following is found. Low cost—in its simplest form a serpentine clamp may made from a band that is about ½ inch longer than the circumference of the outside circumference of the hose to be clamped. The strip width generally is between 7/16 to ¾ inch wide for normal hose situations but may be wider for exceptional hose situations. In its simple configuration, requiring a tool to stretch and set the band, the clamp is a single component, stamped from a strip of 0.020 inch thick metal, for example.

Assuming that the band of the clamp will slide on the surface of the hose, as occurs in all band clamps, each portion of the clamp produces a radial inward force which is substantially identical, except for the ¼ inch portion where the band lock overlaps. This overlap area will produce the same force, have the same "footprint" area, but the orientation of the footprint is not the same as the rest of the serpentine when the lower costing single wrap configuration is used.

The present invention assures that the clamping force is sufficient and yet not excessive, as previously explained. Generally, it is the most reliable of all clamps in this requirement.

The present invention is suitable for a number of different closure or cinching methods. The closures may be used with or without tools, as shown in the various figures, and even a no tool, swing-over-center to lock latch may be effectively used and inexpensively manufactured. Also, the clamp of the present invention may be manufactured from materials that other clamps may be manufactured from. The present invention enables easy inspection of the closure because of the go—no go type decision.

From the following description and claims taken in conjunction with the accompanying drawings, and other objects, the advantages of the present invention will become apparent to one skilled in the art.

DETAILED DESCRIPTION OF THE PREFERRED EMBODIMENT

Turning to the figures, a spring clamp is shown and designated with reference numeral (10). The clamp (10) is positioned over a flexible conduit (12) for securing the conduit (12) onto a fitting (not shown). The clamp (10) includes a flat elongated metallic strip (14) having end portions (16) and (18) and a biasing portion (20). A mechanism (22) for securing the end portions (16) and (18) to one another is positioned on the end portions (16) and (18).

The flat elongated metallic strip (14) may be formed from any suitable metallic sheet material having requisite strength and resilient characteristics. Also, the strip (14) may be formed from non-metallic molded material having requisite strength and resilient characteristics. The strip (14) has a width and thickness such that the width provides a large footprint area for applying radial force around the circumference of the flexible conduit. The thickness of the strip (14) is such that a requisite spring constant may be obtained. The spring constant and deflection of the spring are explained in my co-pending application entitled "Serpentine Strip Spring" U.S. application Ser. No. 916,155, filed Oct. 7, 1986, the specification of which is herein incorporated by reference. Generally, the width to thickness ratio of the strip (14) is three or more.

Figures 2, 3:
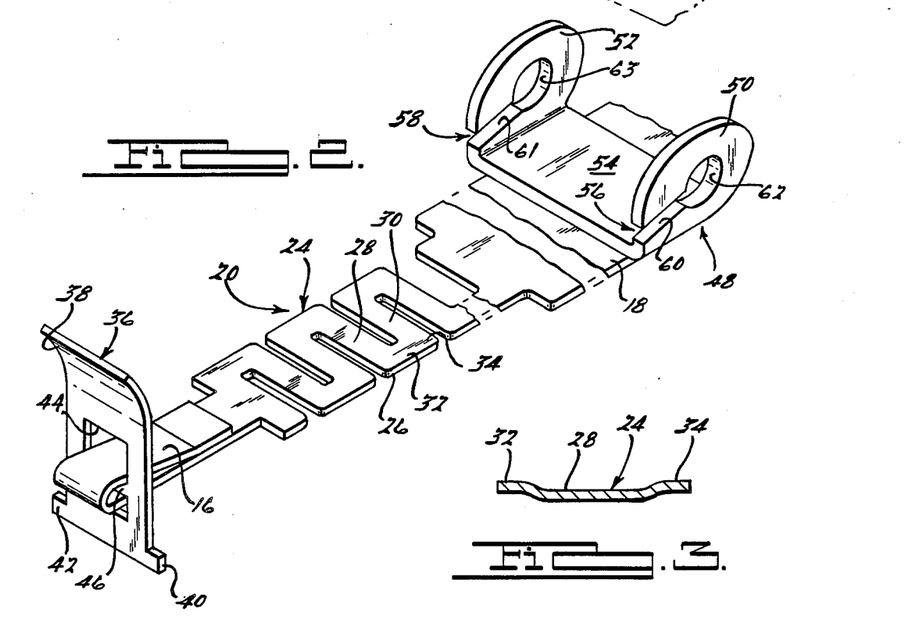
FIG. 2 is a perspective view of FIG. 1 in an unwound position.
FIG. 3 cross section view of FIG. 1 along line 3—3 of the serpentine spring portion.

Generally, the strip (14) has an overall flat elongated rectangular shape. The end portions (16) and (18) are integrally formed on the ends of the strip (14), or may consist of auxiliary parts attached to strip (14). The end portions (16) and (18) are generally rectangularly shaped and are formed from the same material as the strip (14). The biasing portion (20) may be stamped from the strip (14) forming a serpentine configuration (24) in the strip (14). The serpentine configuration (24), forxed of reversing U-shaped members (26), sharing a common leg, acts as the biasing portion (20) of the strip (14). The biasing portion (20) enables the strip (14) to be stretched in a longitudinal axial direction while asserting a substantially equal radial force about the circumference of the conduit (12) while the clamp (10) is in use. Referring to FIG. 2, the reversing U-shaped members (26), making up the serpentine configuration (24), are formed of legs (28) and (30) and base (32). The width of the legs (28) and (30), base (32), curvature (34); the curved portion between the base (32) and the legs (28) and (30), along with the thickness of the strip (14), control the spring constant of the biasing portion (20).

FIG. 2 also illustrates a securement mechanism (22) for fastening the ends (16) and (18) of the strip (14) together. The securement mechanism (22) is generally an over center type fastener, however, a nut and bolt type fastener may be used. The swing latch (36) has an overall rectangular configuration having a down turned lip (38), at one end, and a pair of projecting tabs (40) and (42), at the other end. An aperture (44), having a center bar (46), is formed in the mid portion of the swing latch (36). The bar (46) and aperture (44) enable the swing latch (36) to be secured on the end portion (16) of the strip (14). The end portion (16) is threaded through one portion of the aperture (44) around the bar (46) and back through the other side of the aperture (44). The end portion (16) is doubled back upon itself and secured to itself by conventional means, such as welding. Thus the swing latch (36) is pivotally secured to the elongated strip (14) at the end portion (16). The securement portion (48) of the securing mechanism (22) is affixed to the end portion (18) of the metallic strip (14). The securement portion (48) has an overall rectangular configuration with projecting walls (50) and (52) departing substantially perpendicular to a base (54) of the securement portion (48). The walls (50) and (52) have apertures (56) and (58) for retaining the tabs (40) and (42) in a locked position in the securement portion (48). The apertures (56) and (58) have a slot portion (60) and (61) and a circular portion (62) and (63). The tabs (40) and (42) are inserted through the slot portion (60) and (61) and are seated in the circular portion (62) and (63). The swing latch (36) is pulled down into a lock position, as shown in FIG. 1, in the locked position, the tabs (40) and (42) are retained in the circular portions (62) and (63) of the apertures (56) and (58), respectively, effectively locking the securement mechanism (22) and securing the ends (16) and (18) of the strip (14) together.

Figure 1:
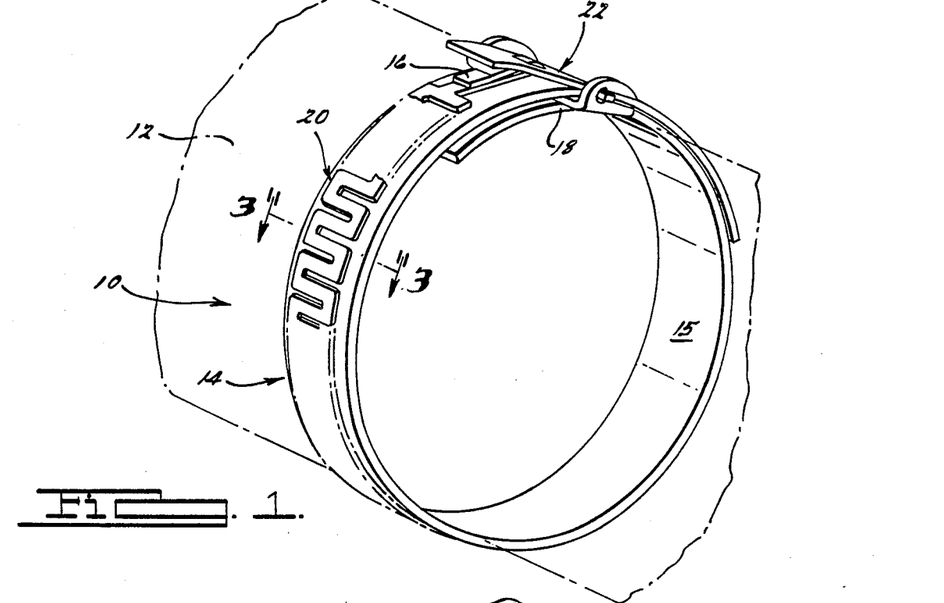
FIG. 1 is a perspective view of a clamp in accordance with the present invention.

The strip (14) is positioned on the conduit (12) and is wrapped around itself such that the biasing portion (20) rests up on the top of the strip portion (15) of the strip (14), as shown in FIG. 1. This double wrapping enables the strip portion (15) to act as the footprint of the clamp (10). The biasing portion (20) applies a radial force onto the strip portion (15) which asserts radially equal forces upon the circumference of the conduit (12) which in turn, secures the conduit (12) onto the fitting (not shown). Portion (15) of strip (14) may be omitted so that only the biasing portion (20) contacts the hose (12), in which case, there is no double wrap. If this alternative is chosen, legs (28) and (30) may be slightly dished as shown in FIG. 3, so that the edges of the biasing portion (20) do not interact with the hose to prevent sliding of the biasing portion (20) on the surface of hose (12). The dishing, or other stamped formed departures from a flat surface of the biasing portion (20) will affect the multiple spring constant effects that are obtainable with the serpentine strip spring, and may serve these multiple functions.

Figure 4:
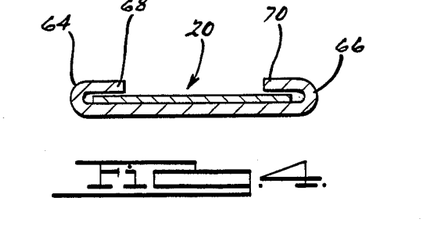
FIG. 4 is a cross section view of an alternate embodiment of FIG. 1.

When a limitation of the deformations across the thickness of the material of the biasing portion (20) is desired or necessary, members (64) and (66) are formed in the strip portion (15) to prevent the biasing portion (20) from being over deformed, as best seen in FIG. 4. The wall members (64) and (66) have extending flanges (68) and (70) projecting over the biasing portion (20) for maintaining the biasing portion (20) within allowable non-permanent deformation limits.

Figure 5:
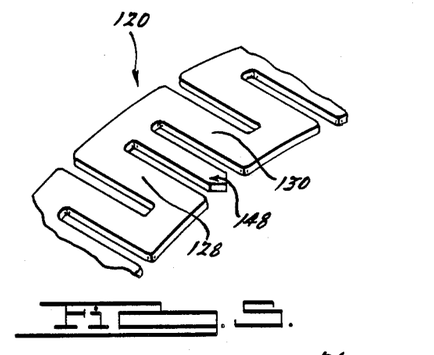
FIG. 5 is a partial perspective view illustrating an integral attachment mechanism.
Figures 6, 7, 7A:
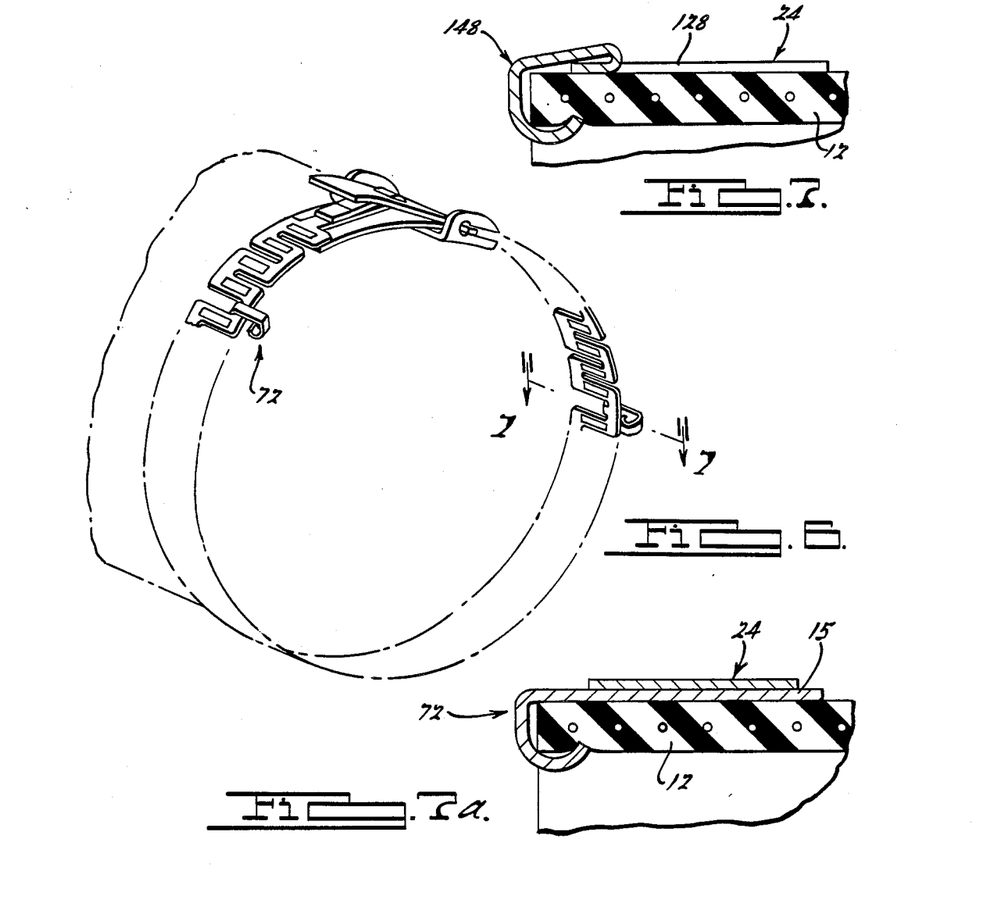
FIG. 6 is a perspective view of another embodiment in accordance with the present invention.
FIG. 7 is a cross-section view of FIG. 6 along line 7—7 thereof.
FIG. 7a is a cross section view of another embodiment of a mechanism for attaching the clamp onto the end of a conduit.

When hose clamps are used on hoses in a high production environment, automotive assembly for example, it is desirable to secure the clamp to the hose prior to using the hose in the rapid assembly environment. FIG. 5 illustrates a portion of the biasing portion (120) where tab (148) has been extended from base (132) between legs (128) and (130). One or more of these tabs (148) or (72), if they are part of portion (15), may be provided to secure the clamp (10) to the hose (12), as shown in FIG. 7 and 7A. FIG. 6 illustrates the clamp (10) in a perspective view.

Figure 8:
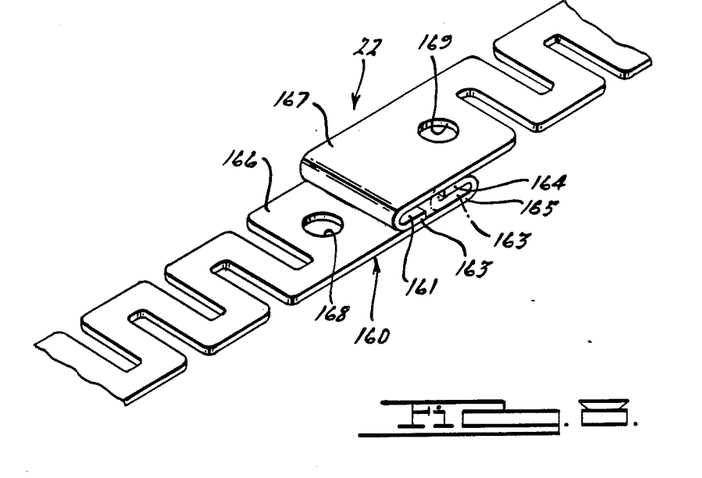
FIG. 8 is a perspective view of another embodiment of a fastening member with the present invention.

FIG. 8 illustrates another embodiment of a securement mechanism (22). The securement mechanism (22) is comprised of two substantially identical members (160) and (162). For the sake of repetition, only one member (160) will be described and it will be noted that the description applies equally well to member (162). The securement member (160) has an overall rectangular shape having a bent end (164) and (163) and an elongated portion (166) and (167). The ends (164) and (163) are bent back around on the elongated portions (166) and (167) and gaps (165) and (161) are formed between the bent ends (164) and (163) and the elongated portions (166) and (167). Apertures (168) and (169) are formed in the elongated portions (166) and (167). The apertures (168) and (169) enable a means, such as long nose pliers, to te inserted into the apertures (168) and (169) of the respective members (160) and (162) so that the securement members (160), (162) may be overlapped and the ends (164) and (163) positioned within one another, locking the ends together, as seen in phantom in FIG. 8. Thus, the hook ends (164) and (163) of the securement members (160), (162) are interlocked within one another for removably securing the ends (16) and (18) of the clamp (10) together.

Figure 9:
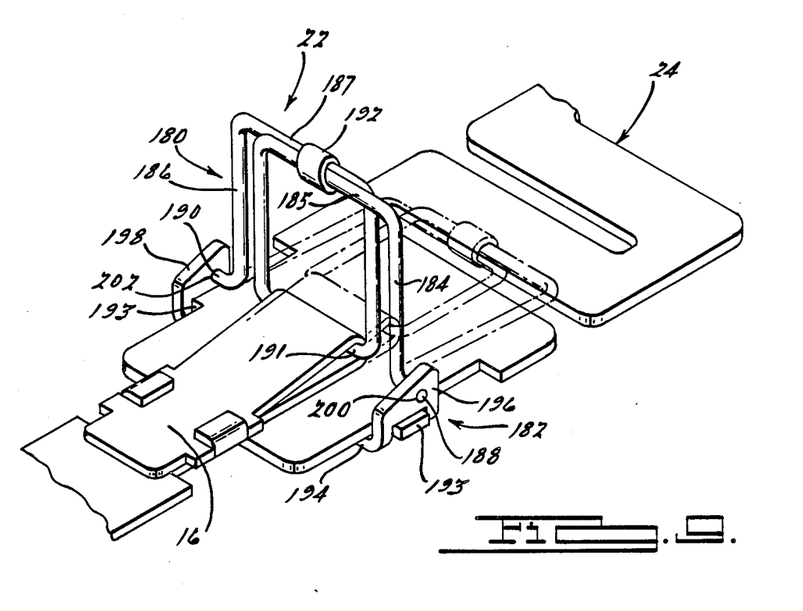
FIG. 9 is a perspective view of another embodiment of a fastening member in accordance with the present invention.

FIG. 9 illustrates another embodiment of the securement mechanism (22). The securement mechanism (22) is comprised of a swing latch (180) and a latch base (182). The swing latch (180) has a pair of latch arms (184), (186), each having a pivot (188) and (190) on the free depending end of the latch arms (184) and (186). The swing latch (180) is formed from a bent configuration wire, having an overall rectangular shape, enabling the pivots (188) and (190) to be moved laterally towards one another for insertion into the latch base (182).

The swing latch (180) has a base (191) between the latch arms (184) and (186) for enabling the end member (16) to be wrapped around and affixed to itself for securing the swing latch (180) to the end member (16). The alternating latch arms (184) and (186) are movably secured together at their top portions (185) and (187) by a ring member (192).

The latch base (182) includes a base (194), secured to end (18) by tabs (193), and a pair of walls (196) and (198) extending substantially perpendicular to the base member (194). The walls (196) and (198) have apertures (200) and (202) for enabling the pivots (188) and (190) to be positioned therein.

The latch arms (184) and (186) of swing latch (180) are squeezed together such that the top portions (185) and (187) slide laterally urging the latch arms (184) and (186) towards one another so that the pivots (188) and (190) may be positioned in apertures (200) to (202) on the base walls (196) and (198). The latch arms (184) and (186) expand urging the pivots (188) and (190) into apertures (200) and (202) securing the ends (16) and (18) of the clamp together. The swing latch (182) is pulled downward, as shown in phantom in FIG. 9, contacting end (18) and locking the swing latch (180) onto the latch base (182) which, in turn, effectively locks the ends (16) and (18) of the clamp (10) to one another securing the clamp onto a conduit.

Figures 10, 11:
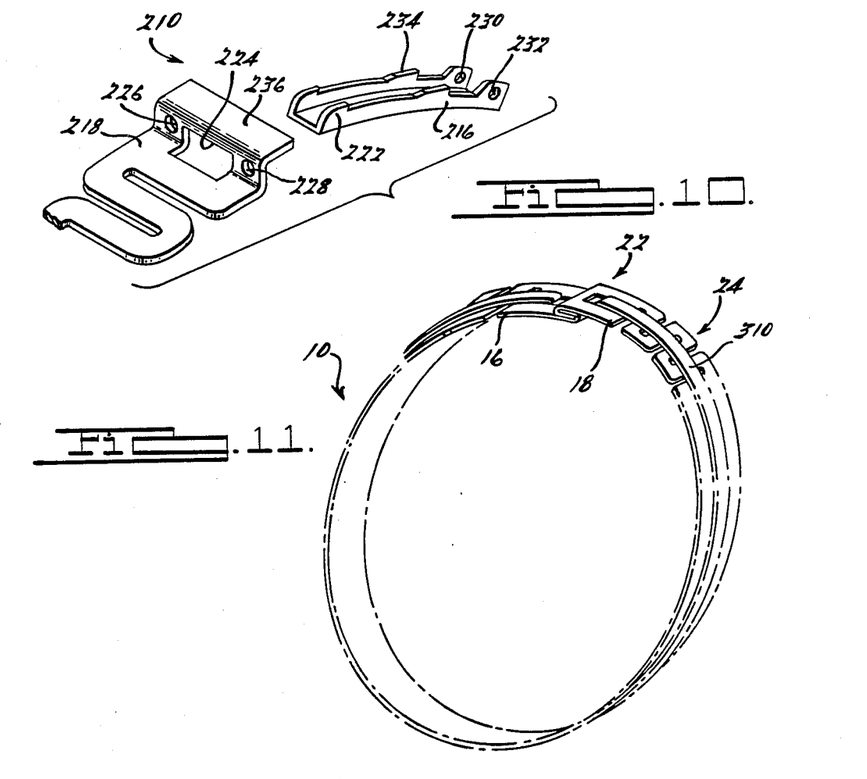
FIG. 10 is a perspective view of another embodiment of a fastening mechanism formed as part of the biasing member.
FIG. 11 is a perspective view of another embodiment of the present invention.

FIG. 10 illustrates a fastening mechanism (210) for the clamp (10) which requires a tool to close the clamp end together. End (222) of end (216) is pre-positioned through aperture (224) of end (218) to hold the clamp (10) in a generally circular shape. The tool (not shown) has a pair of elements that engage end (218) by means of apertures (226) and (228) and an element which engages end (210) through apertures (230) and (232). The clamp (210) is closed by the tool as the tool draws end (216) through aperture (224) until locking portions (234) of end (216) pass beycnd aperture (224) in end (218). When the tool is removed, locking portions (234) engage the edge (236) of aperture (224) locking the ends (216) and (218) together. The clamp is released by placing a small screw driver or the like between locking elements (234) and wedging edge (236) out of engagement with locking elements (234).

FIG. 11 illustrates another embodiment of the clamp (10) where a material strip (310) is affixed to ends (16) and (18). The strip (310) limits the extension of biasing portion (20) providing a maximum diameter of expansion of the clamp (10). The strip (310) prevents hoses from being pulled off over the expanded portion of male nipple ends. This type of embodiment is highly desirable in cases where high pressure blow-off or high hose pull-off forces may be encountered.

Figures 12, 13:
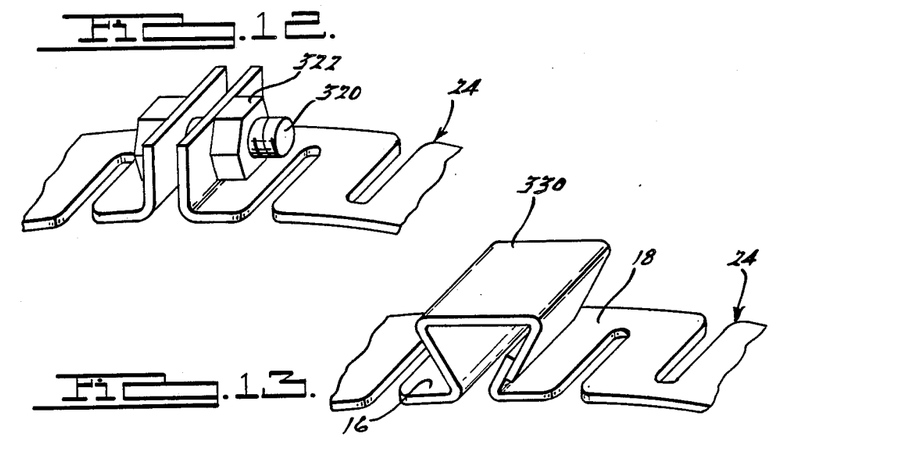
FIG. 12 is a perspective view of another embodiment of a fastening mechanism.
FIG. 13 is a perspective view of another embodiment of a fastening mechanism.

FIG. 12 illustrates another embodiment of a fastening mechanism. The clamp (10) is closed and locked by means of a screw (320) and nut (322).

FIG. 13 illustrates another embodiment of a fastening mechanism. The clamp (10) is closed and locked by means of a deformation device (330).

While the above summarizes the present invention, it will become apparent to those skilled in the art that modification, variations, and alterations may be made without deviating from the scope and fair meaning of the subjoined claims.

What is claimed is:

1. A spring clamp comprising:
    a flat elongated metallic strip having a pair of end portions, said strip having a sufficiently large modulus of elasticity or stiffness;
    a resilient serpentine biasing portion integrally formed in said strip between said end portions, said resilient serpentine biasing portion comprised of a plurality of interconnected unitary U-shaped members having a pair of legs connected by a web, each alternating U-shaped member being inverted with respect to its adjacent U-shaped members, an elongated slot formed between the legs of each U-shaped member, said elongated slot extending from a lateral edge of the strip passed the longitudinal axis of the strip, said resilient serpentine biasing portion providing axial deflection along the longitudinal axis of the strip, said resilient biasing portion U-shaped members each having an overall rectangular cross-section with a substantially constant thickness, said resilient biasing portion resiliently deflecting in a first direction along said longitudinal axis in response to a force applied on said stip and resiliently deflecting in a second direction along said thickness of said cross-section in response to continued force applied on said strip; and
    means on said end portions for removably securing and fastening said ends together.

2. The spring clamp according to claim 1 wherein said clamp is double wrapped around a conduit such that the elongated metallic strip is associated with and positioned adjacent said spring portion of said strip around the periphery of the conduit.

3. The spring clamp according to claim 2 wherein said spring portion is serpentine and stamped out of said elongated strip.

4. The spring clamp according to claim 1 wherein said means for fastening said pair of ends is an over center fastener.

5. The spring clamp according to claim 1 wherein said spring portion of said strip is serpentine and stamped out of said elongated strip.

6. The spring clamp according to claim 1 wherein said elongated strip is flat planar sheet metallic material.

7. The spring clamp according to claim 1 wherein said end portions are fastened by a screw means.

8. The spring clamp according to claim 1 wherein tab means project from said elongated strip for retaining said spring clamp on an end of a flexible conduit.

9. The spring clamp according to claim 8 wherein said tab means includes at least one bent U-configuration member projecting from said strip for positioning said spring clamp at a predetermined distance from the end of said flexible conduit.

10. The spring clamp according to claim 1 wherein said fastening means being integrally formed on said end portions.

11. The spring clamp according to claim 1 wherein said fastening means being a deformable element.

12. The spring clamp according to claim 1 wherein the biasing portion provides more than one mode of deformation for producing more than one force versus extension response.

13. The spring clamp comprising:
    a flat elongated substantially planar metallic strip having a pair of end portions;
    a resilient serpentine biasing portion between said end portions comprised of a plurality of interconnected unitary U-shaped members having a pair of legs connected by a web, each alternating U-shaped member being inverted with respect to its adjacent U-shaped members, an elongated slot formed between the legs of each U-shaped member, said elongated slot extending from a lateral edge of the strip passed the longitudinal axis of the strip and said serpentine biasing portion continuous with said elongated strip for providing axial deflection along the longitudinal axis of said strip, said resilient serpentine biasing U-shaped members each having an overall rectangular cross-section with a substantially constant thickness, said serpentine portion resiliently deflecting in a first direction along said longitudinal axis in response to a force applied on said strip and resiliently deflecting in a second direction along said thickness of said cross-section in response to continued force applied on said strip; and
    means for removably fastening said end portions to one another for enabling said clamp to be secured to a conduit.

14. The spring clamp according to claim 13 wherein said strip is double wrapped around the periphery of the conduit such that a portion of the elongaged metallic strip is associated with and positioned adjacent said serpentine portion of said strip about the periphery of the conduit.

15. The spring clamp according to claim 13 wherein said means for fastening said pair of ends is an over center fastener.

16. The spring clamp according to claim 13 wherein said elongated strip is formed from flat planar metallic sheet material.

17. The spring clamp according to claim 13 wherein a tab means is formed on said elongated strip for positioning said spring clamp on an end of flexible conduit.

18. The spring clamp according to claim 17 wherein said tab means includes at least one bent U-configuration member projecting from said strip for positioning said spring clamp at a predetermined distance from the end of said conduit.

19. A method of manufacturing a spring clamp out of flat elongated metallic strip comprising:

providing a flat, planar, elongated metallic strip with a substantially constant thickness, said strip having two end portions;

forming an elongated integral resilient biasing portion including a plurality of interconnected unitary U-shaped members having a pair of legs connected by a web, each alternating U-shaped member being inverted with respect to its adjacent U-shaped members, an elongated slot formed between the legs of each U-shaped member, said elongated slot extending from a lateral edge of the strip passed the longitudinal axis of the strip in said elongated strip between said end portions; and affixing means for fastening said end portions to one another on said end portions of said elongated strip.

20. The method according to claim 19 wherein said forming of said biasing portion includes stamping said elongated strip.

21. The method according to claim 20 wherein said stamping forms a serpentine portion in said strip between said end portions.

22. The method according to claim 20 wherein said stamping forms means of fastening said ends together.

23. A spring clamp comprising:

a flat, planar elongated non-metallic strip having a pair of end portions;

a resilient serpentine biasing portion between said end portions comprised of a plurality of interconnected unitary U-shaped members having a pair of legs connected by a web, each alternating U-shaped member being inverted with respect to its adjacent U-shaped members, an elongated slot formed between the legs of each U-shaped member, said elongated slot extending from a lateral edge of the strip passed the longitudinal axis of the strip and continuous with said elongated strip for providing said strip with resilient spring characteristics; and means for removable fastening said end portions to one another for enabling said clamp to be secured to a conduit.

* * * * *